(12) United States Patent
Ting et al.

(10) Patent No.: US 6,500,583 B1
(45) Date of Patent: Dec. 31, 2002

(54) ELECTROCHEMICAL HYDROGEN STORAGE ALLOYS FOR NICKEL METAL HYDRIDE BATTERIES, FUEL CELLS AND METHODS OF MANUFACTURING SAME

(75) Inventors: Jason Ting, Oakdale, PA (US); Ulrike Habel, Pittsburgh, PA (US); Michael W. Peretti, Finleyville, PA (US); William B. Eisen, Pittsburgh, PA (US); Rosa Young, Bloomfield Hills, MI (US); Benjamin Chao, Troy, MI (US); Baoquan Huang, Troy, MI (US)

(73) Assignees: Energy Conversion Devices, Inc., Rochester Hills, MI (US); Crucible Materials Corp., Syracuse, NY (US)

( * ) Notice: Subject to any disclaimer, the term of this patent is extended or adjusted under 35 U.S.C. 154(b) by 6 days.

(21) Appl. No.: 09/617,162

(22) Filed: Jul. 17, 2000

(51) Int. Cl.$^7$ ............................. H01M 4/58; H01M 6/00
(52) U.S. Cl. ...................... 429/218.2; 29/623.1; 429/60
(58) Field of Search ................................. 429/60, 218.2; 29/623.1

(56) References Cited

U.S. PATENT DOCUMENTS

| | | | | | |
|---|---|---|---|---|---|
| 4,637,967 | A | * | 1/1987 | Keem et al. | 429/101 |
| 5,554,456 | A | * | 9/1996 | Ovshinsky et al. | 429/59 |
| 5,840,440 | A | * | 11/1998 | Ovshinsky et al. | 429/60 |

* cited by examiner

*Primary Examiner*—Carol Chaney
*Assistant Examiner*—Tracy Dove
(74) *Attorney, Agent, or Firm*—David W. Schumaker; Marvin S. Siskind

(57) ABSTRACT

Practice of this invention provides, at least, a method of making a hydrogen storage material comprising the steps of:
1. forming a molten mixture comprising nickel and at least one other transition metal element, the combination of which will form a TiNi alloy and including in said molten mixture from about 0.1 at. % to about 10 at. % of one or more elements which will form an alloy which is immiscible in the TiNi-type alloy; and
(b) cooling said molten mixture to form a solid alloy-system material by rapid solidification of said molten mixture at a cooling rate of at least $10^{3°}$ C. per second.

12 Claims, 10 Drawing Sheets

ELECTROCHEMICAL HYDROGEN STORAGE ALLOYS FOR NICKEL METAL HYDRIDE BATTERIES, FUEL CELLS AND METHODS OF MANUFACTURING SAME

FIELD OF THE INVENTION

The present invention relates to electrochemical hydrogen storage alloys, rechargeable electrochemical cells, fuel cells using these alloys, and to methods of manufacturing the same.

More particularly, the invention relates to rechargeable cells, batteries, and fuel cells having at least one electrode formed of multicomponent, electrochemical hydrogen storage material or alloy. In one embodiment, such multicomponent alloys include discrete regions, small in size and widely distributed as will be hereinafter described, which differ compositionally from the bulk alloy and which contribute to the high rate capabilities of the alloys of the present invention. The present invention also includes methods of manufacturing the improved alloys to significantly further enhance such improved performance characteristics. The methods of the present invention assure that the size range and distribution of the aforementioned regions are optimized for enhancement of the rate capabilities of the alloys of the invention. Cells that incorporate these alloys have significantly improved performance characteristics, particularly with respect to exhibiting high discharge rates.

BACKGROUND OF THE INVENTION

Rechargeable cells that use a nickel hydroxide positive electrode and a metal hydride forming hydrogen storage negative electrode ("metal hydride cells") are known in the art.

When an electrical potential is applied between the electrolyte and a metal hydride electrode in a metal hydride electrochemical cell, the negative electrode material (M) is charged by the electrochemical absorption of hydrogen and the electrochemical evolution of a hydroxyl ion; upon discharge, the stored hydrogen is released to form a water molecule and evolve an electron:

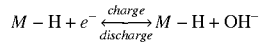

The reactions that take place at the positive electrode of a nickel metal hydride cell are also reversible. Most metal hydride cells use a nickel hydroxide positive electrode. The following charge and discharge reactions take place at a nickel hydroxide positive electrode:

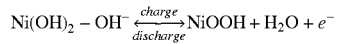

In a metal hydride cell having a nickel hydroxide positive electrode and a hydrogen storage negative electrode, the electrodes are typically separated by a non-woven, felted, nylon or polypropylene separator. The electrolyte is usually an alkaline aqueous electrolyte, for example, 20 to 45 weight percent potassium hydroxide. The first hydrogen storage alloys to be investigated as battery electrode materials were TiNi and LaNi$_5$. Many years were spent studying these simple binary intermetallics because they were known to have the proper hydrogen bond strength for use in electrochemical applications. Despite extensive efforts, however, researchers found these intermetallics to be extremely unstable and of marginal electrochemical value due to a variety of deleterious effects such as slow discharge, oxidation, corrosion, poor kinetics, and poor catalysis. These simple alloys for battery applications reflect the traditional bias of battery developers toward the use of single element couples of crystalline materials such as NiCd, NaS, LiMS, ZnBr, NiFe, NiZn, and Pb-acid. In order to improve the electrochemical properties of the binary intermetallics while maintaining the hydrogen storage efficiency, early workers began modifying TiNi and LaNi$_5$ systems.

The modification of TiNi and LaNi$_5$ was initiated by Stanford R. Ovshinsky at Energy Conversion Devices (ECD) of Troy, Mich. Ovshinsky and his team at ECD showed that reliance on simple, relatively pure compounds was a major shortcoming of the prior art. Prior work had determined that catalytic action depends on surface reactions at sites of irregularities in the crystal structure. Relatively pure compounds were found to have a relatively low density of hydrogen storage sites, and the type of sites available occurred accidently and were not designed into the bulk of the material. Thus, the efficiency of the storage of hydrogen and the subsequent release of hydrogen was determined to be substantially less than that which would be possible if a greater number and variety of active sites were available.

Ovshinsky had previously found that the number of surface sites could be increased significantly by making an amorphous film that resembled the surface of the desired relatively pure materials. One of the characteristics of hydrogen storage alloys, particularly electrochemically activated hydrogen storage alloys, which researchers have sought to improve is the hydriding-dehydriding kinetics, or the speed of hydrogen absorption and desorption. This affects the charge and discharge rates at which the battery can operate and determines the applications for which the battery is suitable. For example, such applications as hybrid electric vehicle propulsion require very high discharge rate capabilities in order to meet vehicle torque and acceleration requirements and also very high charge rates to accommodate regenerative braking requirements.

An approach to improving these kinetic characteristics has been to explore mixing alloys of the TiNi and LaNi$_5$ types. TiNi alloys are often referred to as AB$_2$ alloys and LaNi$_5$ alloys as AB$_5$ alloys.

Bououdina, et al. describe, in "Improved Kinetics by the Multiphase Alloys Prepared from Laves Phases and LaNi$_5$" as published in *Journal of Alloys and Compounds* 288 (1999) 22–237, a new method to prepare hydrogen absorbing alloys from single phase intermetallic ones. To improve speed of hydrogen absorption and desorbtion, these authors intended to improve the hydriding-dehydriding kinetics, or speed, of the single phase system found in chromium and nickel modified Zirconium/Titanium Laves alloy (an AB$_2$ type alloy). This was accomplished by melting of two single-phase intermetallic compounds. Of particular interest was addition of LaNi$_5$ (an AB$_5$ type alloy) to the described Laves AB$_2$ alloy. This combination was chosen in light of the difficulties of preparing homogeneous alloys using rare earth elements and a Laves phase alloy, which stem from the approximately 750° C. difference in melting temperatures. Another consideration was the ease of preparation of the LaNi$_5$ as a single-phase material and its higher hydrogen kinetics coupled with a flat plateau for charging and discharging.

Yang et al. describe, in "Contribution of Rare-Earths to Activation Property of Zr-based Hydride Electrodes" as published in the Journal of Alloys and Compounds, 293–295 (1999) pgs. 632–636, the effect of alloying cerium and either cerium-rich mischmetal or lanthanum-rich mischmetal on the crystalline characteristics and electrochemical performances of $AB_2$ type hydride electrodes. Alloys of compositions $ZrMn_{0.5}Cr_{0.10}V_{0.3}Ni_{1.1}$ and $Zr_{0.9}T_{0.1}Mn_{0.5}Cr_{0.10}V_{0.3}Ni_{1.1}$ (T=Ml, mischmetal, or cerium and Ml=lanthanum-rich mischmetal) were prepared by arc melting under argon atmosphere with as-cast alloy ingots being crushed mechanically in air. Hydride electrodes were prepared by cold pressing the mixtures of different alloy powder with powdered copper in a weight ratio of 1:2 to form porous pellets of 10 mm diameter. Electrochemical charge-discharge tests were carried out in a trielectrode electrolysis cell in which the counter-electrode was nickel oxyhydroxide with excess capacity, the reference electrode was Hg/HgO.6M KOH, and the electrolyte was 6 M KOH solution. Discharge capacities were determined by galvanostatic method.

It was determined that cerium or mischmetal alloying can "basically" solve the problem of activation of a $ZrMn_{0.5}Cr_{0.10}V_{0.3}Ni_{1.1}$ alloy electrode and that after rare-earth alloying, the maximum capacities rise from 250 mAh/g of the mother alloy $ZrMn_{0.5}Cr_{0.10}V_{0.3}Ni_{1.1}$ to 356 mAh/g of the cerium-containing one.

Yang et al. describe, in "Activation of $AB_2$ Type Zr-based Hydride Electrodes" as published in *ACTA METALLURGICA SINICA*, Vol 11, No. 2 (April 1998) pgs. 107–110, the effect of lanthanum alloying on the crystalline characteristics, electrochemical capacity, and activity of $AB_2$ type Zr—Cr—Ni hydride electrodes. The alloys studied were prepared by arc melting under argon with the purity of the constituent metals above 99.9%. The as-cast alloy was crushed mechanically in air and sieved through 360 mesh. Hydride electrodes were prepared by cold pressing, with 300 mesh powdered electrolytic copper in a 1:2 weight ratio, to form porous 10 mm diameter pellets in copper holders. Electrochemical charge-discharge tests were carried out in a trielectrode electrolysis cell in which the counter-electrode was nickel oxyhydroxide with excess capacity, the reference electrode was Hg/HgO.6M KOH, and the electrolyte was 6 M KOH solution. Discharge capacities were determined by galvanostatic method.

The previously mentioned researchers found some level of incremental improvement in the hydriding/dehydriding kinetics of this combination of $AB_2$ and $AB_5$ metals. For the instant invention, however, we have found that development of short-range order, on the sub-micrometer to few micrometer level, will yield discreet regions of $TiNi_5$-type alloys in a matrix of the TiNi-type alloy. While not wishing to be bound by theory, it is possible that there is some catalytic activity occurring at the surface of the $TiNi_5$-type discreet region; it is possible that a synergistic effect relating to hydrogen catalysis or storage occurs at the TiNi-type matrix material boundary or interface with the $TiNi_5$ region. Whatever is occurring, it is of notable beneficial use for electrochemical hydrogen catalysis, storage, reaction surfaces, and their combinations. While the mechanism of function here may not be understood clearly at the moment, we do know that with this combination of phases coupled with a rapid solidification, cooling, or quenching we obtain excellent electrochemical hydrogen storage with excellent electrochemical hydriding/dehydriding activity or, simply, excellent hydrogen kinetics and storage.

U.S. Pat. No. 5,554,456, issued to Ovshinsky, et al. Sept. 10, 1996, describes non-uniform heterogeneous powder particles for electrochemical uses, and said powder particles comprising at least two separate and distinct hydrogen storage alloys blended together. This invention notes the usefulness of magnesium-based alloys among others and describes methods of inclusion of multiple alloys in electrochemically activated hydrogen storage materials.

Appreciation of the Ovshinsky principles of disorder or ovonics requires that order and disorder be recognized at different levels particularly including those of composition, structure, and translation. Respectively, these levels of order or disorder may be considered on a distance scale of a few through several interatomic distances, through hundreds of interatomic distances, to generally more than a thousand interatomic distances. Again respectively, these varying scales of disorder will affect a material's crystal structure or lack thereof, a material's inter-grain boundaries or lack thereof, as well as a material's morphology and surface characteristics. Application of these principles is useful in the field of energy storage but all levels of possible disorder must at least be recognized and dealt with to provide optimum overall properties. Some have dealt with different portions of the spectrum of ovonic principles, those of disorder, to advance the art. This invention recognizes the work of others and advances or builds upon those contributions to more fully realize the benefits of disordered ovonic materials by combining properties in a useful manner, and recognizing at least the translational level of disorder to gain benefit from such properties.

Ovshinsky describes, in "Amorphous and Disordered Materials—the Basis of new Industries" as published by The Materials Research Society in *Materials Research Society Symposium Proceedings*, vol. 554 (1999), pgs. 399–412, the principles of disorder and provides useful conceptual means for their understanding. Others have noted the usefulness of hydrogen absorptive materials and have worked with alloys of interest. Still others have recognized the usefulness of high hydrogen kinetics or rapid absorption/desorption of hydrogen, and worked with such materials. Beyond these researchers, others have combined two materials with differing characteristics. None, however, have arrived at the methods or means for producing the high capacities for rapid charging and high rate dependable discharging as well as stable storage capacity and high surface area as combined in the materials attainable through practice of our invention.

SUMMARY OF INVENTION

This invention provides, at least, electrochemical hydrogen storage materials with excellent storage capacity and excellent hydrogen kinetics. Such materials are very well suited to serve as electrodes for batteries, fuel cells, and in other applications in which high surface activity may be useful. Such products are obtained by combining alloys having good electrochemical hydriding/dehydriding characteristics with alloys having good electrochemical hydrogen storage capacity. These respective materials are the $LaNi_5$-type materials or alloys and the TiNi-type alloys or materials; as noted earlier, these are also known in the art as, again respectively, $AB_5$ and $AB_2$ alloys or materials.

In particular, our invention provides multi-phase hydrogen storage materials suitable for use as electrode material for electrochemical reactions, energy generation, energy storage, combinations of these, and as reaction surfaces. This is accomplished by providing a combination of alloy phases in a unique microstructural arrangement in which at least one alloy having high hydrogen kinetics or storage characteristics is substantially evenly dispersed in minute, yet distinct, regions within a matrix of at least one alloy having good qualities in the complementary characteristic. This is accomplished by combining the at least two alloys, or their components, melting them and quenching rapidly to form the unique microstructure described. The rapid quenching should be accomplished in a manner to cause minute, discreet regions of one phase to form, yet also in a manner to prevent such minute regions from aggregating or growing too large.

This means that the quenching should be slow enough to allow precipitation to begin and some growth to occur; but rapid enough to prevent growth of overly large regions. Such a scheme may be determined without undue experimentation, particularly in light of the understanding that the benefit in this unique combination and microstructure apparently derives from a surface effect relating to the interaction of the distinct phases; benefit will accrue through optimization of that effect.

As a general matter small particles, or overall enhanced surface area, provide useful reaction surfaces. Smaller particles of this multi-phase alloy system will, in the absence of other competing factors, provide better electrodes or reaction surfaces. A method of enhancing the characteristics of interest for the storage alloys of this invention is gas-atomization. This method allows simultaneous provision of finely divided bulk multi-phase alloy as well as providing a means of attaining the rapid-quenching which is so useful in assuring, for example, the fine dispersion of the highly kinetic alloy phase within the high storage capacity alloy matrix phase in each discreet, atomized and solidified particle of the bulk combination.

Additional benefit appears to accrue by treating the quenched, particularly the atomized, powder in a manner to enhance exposure of the discreet regions of the finely dispersed phase. This may be accomplished by crushing, etching, cracking, and fracturing the particles or otherwise opening pathways for electrolyte media, in the exemplified alloy system, to reach the highly active surfaces or interfacial areas available throughout the individual particles of the alloy system.

DETAILED DESCRIPTION OF THE INVENTION

Figure 1:
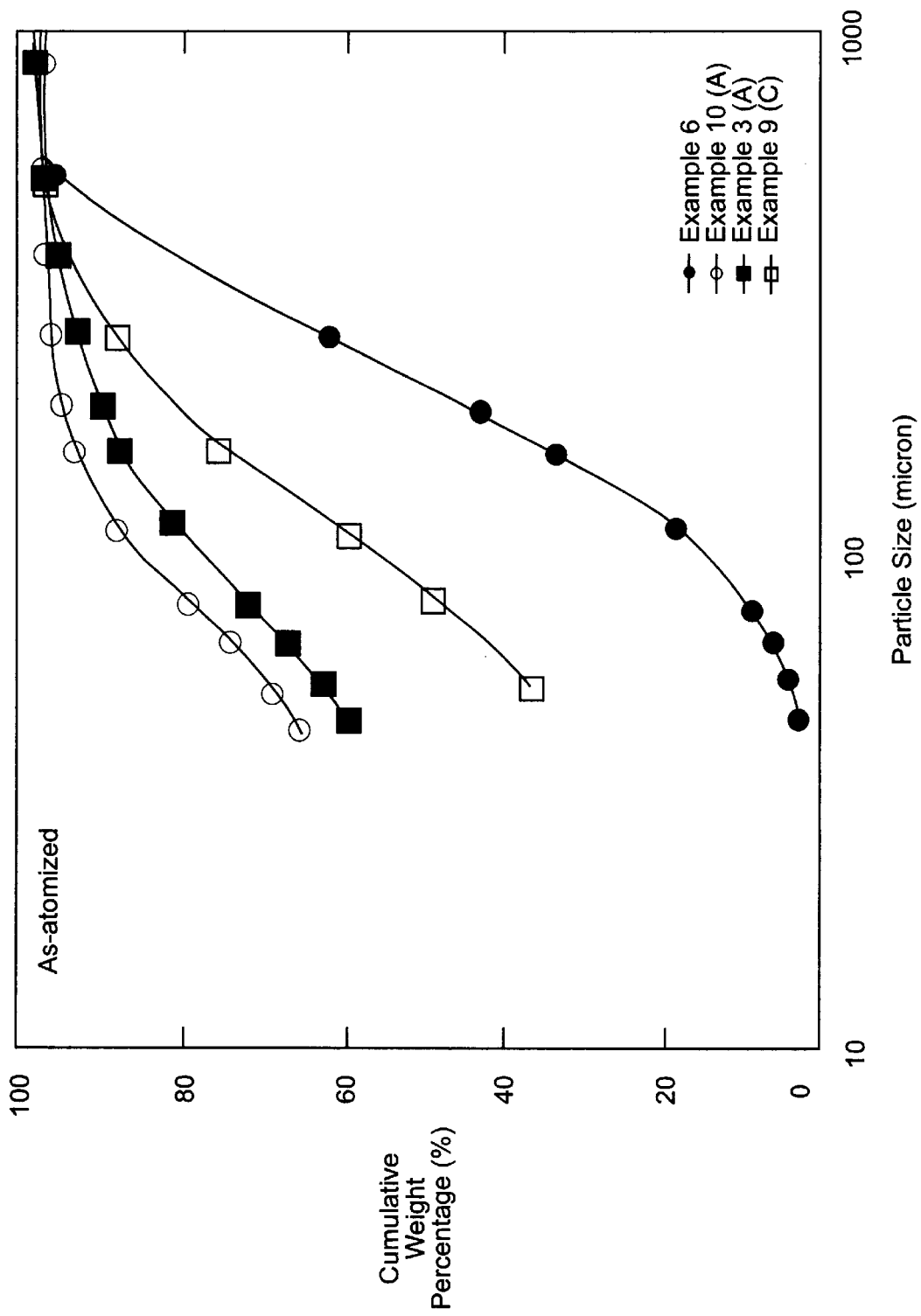
FIG. 1 provides a graphic presentation of particle size distribution produced by various gas-atomization trials using single phase alloys and multi-phase alloy-systems.

Our invention provides various embodiments related to alloys, particularly those which are finely divided, having high electrochemical hydrogen storage capacity coupled with advantageously high electrochemical hydriding/dehydriding kinetics. A notably useful embodiment provides a process for producing or manufacturing multi-phase alloy materials useful for electrochemical hydrogen storage, which are especially useful in making electrodes for metal hydride batteries, fuel cells, reaction surfaces, or for combinations thereof, comprising the steps of:

(a) forming a molten mixture comprising nickel and at least one other transition metal element, the combination of which will form a TiNi-type alloy and including in said molten mixture from about 0.1 atomic. % to about 10 atomic % of one or more elements which will form an alloy which is immiscible in the TiNi-type alloy, preferably a TiNi$_5$-type; and (b) cooling said molten mixture to form a solid alloy-system material by rapid solidification of said molten mixture at a cooling rate of at least $10^{3°}$ C. per second.

For these purposes, the TiNi-type, sometimes known as AB$_2$-type, material is defined to be any alloy having the general formula AB$_2$ in which constituent A includes Ti and Zr and possibly other hydride forming elements which by way of example and not limitation may be Hf, Ta, Y, Ca, Mg, La, Ce, Pr, Mm, Nb, Nd, Mo, Al, and Si (wherein Mm refers to the combination of rare earth elements commonly known as "mischmetal"); constituent B includes Ni and Mn and may include one or more other elements which by way of example and not limitation may be Ti, V, Cr, Fe, Co, Cu, Zn, Al, Si, Nb, Mo, W, Mg, Au, Cd, In, Sn, Bi, La, Ce, and Mm; wherein the total atomic percent of constituent A in the alloy is in the range of about 29%–37%, it being understood that small but measurable amounts of other elements as impurities not intentionally added may be incidentally present in the alloy. Preferably, the range of the atomic % of the elements which will form the immiscible phase will be about 1 atomic % through about 7 atomic %. This will allow good dispersion but not allow a high level of aggregation of the immiscible materials.

Additionally, the TiNi$_5$-type, sometimes known as AB$_5$-type, material or alloy is defined to be any alloy having the general chemical formula AB$_5$ in which constituent A represents one or more hydride-forming elements, with the majority of the atomic percentage of constituent A being one or more elements which, by way of example and not limitation, may include Ni, Co, Mn, and Al; and wherein the total atomic percentage of constituent A is in the range of about 14%–20%, it being understood that small but measurable amounts of other elements such as impurities not intentionally added may be incidentally present in the alloy. B represents one or more elements which include the rare earth elements including lanthanum and may also include Sc, Y, Ca, Sr, and Ba. Mm, or "mischmetal", is also acceptable as the B constituent in this alloy.

For each of these individual alloys, A and B cannot be the same.

For this embodiment, it is useful to combine components needed to produce the multiple alloy phases of interest. Such components necessary for all of the multiple alloys may be combined and melted. Alternatively, the alloys may be made separately, particularly with the TiNi-type alloy in advance. Such pre-made alloy may then be combined with the components comprising one or more elements which include the rare earth elements including lanthanum and may also include Sc, Y, Ca, Sr, and Ba. Mm or "mischmetal", or their combinations. Additionally, the multiple alloys of interest may be mechanically alloyed without necessity of actually melting prior to combining, melting, and rapidly solidifying to create the fine dispersion of multi-phase alloys.

As a matter of interest, it is not necessary to include, in the components to make the dispersed alloy, the companion elements for the one or more elements which include the rare earth elements including lanthanum and may also include Sc, Y, Ca, Sr, and Ba. Mm or "mischmetal", or their combinations in the initial melt. These components may be added last since such elements will generally scavenge, from the first made alloy or its components, sufficient companion material to complete its own alloy. The formation of what appears to be the $LaNi_5$ material is an excellent example of this phenomenon. It has, for example, been demonstrated that addition of a small amount of lanthanum to molten alloy consisting essentially of Zr, Ti, V, Cr, Mn, and Ni will yield a fine example of minute $LaNi_5$ precipitates in a matrix of $AB_2$-type alloy since the lanthanum or lanthanum-like element will "seek", scavenge, "borrow", or combine with sufficient nickel to create a $LaNi_5$-type material, also known as an $AB_5$-type alloy.

At this point, once the components of the multi-phase alloy are present and available, melting should occur if it has not already occurred. Again, if desired, the scavenging group which would include one or more elements which include the rare earth elements including lanthanum and may also include Sc, Y, Ca, Sr, and Ba. Mm, or "mischmetal", or their combinations and companion components may simply be added to the molten base, or mother, alloy. As noted, this may be done with either a pre-made matrix alloy or with components. By this process, it will simply scavenge from the mother alloy the necessary companion metal to form the precipitating metal alloy. Normally the scavenging metal will be a rare-earth or group 3 metal, but may also include the metals below Mg in the Periodic Table of the Elements or varying combinations of these, for creation of the $LaNi_5$-type alloy which will precipitate out of the molten solid solution of the $TiNi/LaNi_5$-type alloy combination. The rare earth/group 3 element or combinations of elements are able to scavenge sufficient nickel, or nickel-type analogue, to build the desired alloy combination or sufficient nickel-type material may be included in the composition.

To obtain the useful dispersion of the precipitated phase, quenching must occur rapidly enough to prevent growth of extremely large aggregates of that phase but slowly enough for them to form into distinct precipitates at the precipitation nuclei, or follow whatever path for precipitation may be useful. Properly accomplishing the quench step will yield useful multi-phase material no matter what actually occurs or whether or not the entire mechanism is fully understood. We have successfully used a quench rate of greater than about $10^{3°}$ C./sec. This may be done by atomization of the molten material into a cooling atmosphere or by melt spinning. Preferably the solidification should occur in a manner to limit the growth of the $TiNi_5$-type alloy domains or aggregates; this may be accomplished by keeping the cooling rate below about $10^{6°}$ C./sec, more preferably between about $10^{4°}$ C./sec through about $10^{5°}$ C./sec. Beneficial results have accrued with gas atomization using argon after initial pump-down as the atomizing gas and cooling fluid; pressure during melt was slightly above ambient pressure to assure exclusion of ambient atmosphere through any possible leaks, approximately one p.s.i. above atmospheric pressure worked well. Atmosphere which is non-reactive with the metals being used or melted is the main concern. For our work the gas-atomizations used a free fall atomizing geometry with good results.

An added advantage of use of a process such as gas-atomization is that the resulting form of the material may be selected to be distinct particles within a wide range of sizes. We found that useful results accrued with particles ranging in size from between about 5 $\mu$m through about 1000 $\mu$m; smaller or larger particle sizes may be more or less useful depending upon the application and is determinable without undue experimentation. Within a broad range of particle sizes, a section of the particle size range may be particularly useful; combinations of multiple sections of the size range may be useful depending upon the desired packing density, overall surface area, and other factors of interest. These processing parameters, too, are determinable by those skilled in the art without undue experimentation dependent upon the need to be met by the multi-phase alloy system. We obtained useful results adjusting the process to obtain a median particle size within the range of about between 30 $\mu$m to 250 $\mu$m.

We found it useful to optimize the surface exposure of the minuscule regions or domains of the precipitated alloy within the minute particles of the multi-phase alloy system. As a general matter, it appears that charge/discharge rates are enhanced with materials in which such exposure of the smaller domains is optimized. Such enhancement, if needed or desired, may be accomplished by physical or chemical etching, abrasion, cracking, crushing, breaking, fracturing, or any other suitable means to assist in optimizing, otherwise augmenting, or controlling such exposure of the infinitesimal internal domains; this determination may also be made without undue experimentation by those skilled in the art in consideration of the final need to be filled by the powder. We found crushing or fracturing of the powder, by use of a Gilson laboratory-scale ball mill with an about 5 cm (2 inch) steel ball in an argon-filled glove box for about five minutes to be a beneficial means of attaining the desired result.

Without particular need to fully understand the mechanics of what occurred, we also found that crushing combined with annealing, generally preferably annealing after crushing, yielded useful results. This was done for about five minutes at about 800° C. again, preferably after crushing as this order generally seemed to produce better results and generally enhanced the charge/discharge rates of the test electrodes. While not wishing to be bound by theory, it is possible that such annealing simply serves to consolidate the areas of fracture or provide better matrix phase contact with the microscopic internal precipitated domains. Whatever happens on the atomic or grain level, it helped enhance results and appeared to make the alloy system characteristics more desirable as well as enhance stability. The need for such enhancement or making permanent such characteristics and the details of such a treatment plan may be determined without undue experimentation by those skilled in the art in consideration of the final need to be met by the material or alloy-system.

The creation, and post-formation treatment, of the finely divided alloy system comprising the finely dispersed and precipitated phase within the matrix phase is effectively complete at this point and the material may be collected or recovered. Further treatment or classification may occur as desired or deemed useful. Such finely divided alloy-system may now be processed into useful end products, particularly as electrochemical hydrogen storage material, electrodes or reaction surfaces for fuel cells and batteries or their combinations.

Another particularly useful embodiment of our invention provides electrode alloy material for use in electrodes suitable for use in an alkaline environment comprising:

a multi-phase alloy-system comprising $AB_2$ type and $AB_5$ type material formed by rapid solidification, said alloy-system comprising:
(a) a matrix phase and
(b) a finely dispersed phase discontinuously and substantially uniformly distributed as discreet domains throughout the matrix phase, which alloy system was cooled at a rate of at least about $10^{3°}$ C./sec.

As noted in the prior embodiments, we have successfully used a quench rate of greater than about $10^{3°}$ C./sec. This may be done by atomization of the molten material into a cooling atmosphere or by melt spinning. Preferably the solidification should occur in a manner to limit the growth of the $TiNi_5$-type alloy domains or aggregates; this may be accomplished by keeping the cooling rate below about $10^{6°}$ C./sec, more preferably between about $10^{4°}$ C./sec through about $10^{5°}$ C./sec. Beneficial results have accrued with gas atomization using argon after initial pump-down as the atomizing gas and cooling fluid; pressure during melt was slightly above ambient pressure to assure exclusion of ambient atmosphere through any possible leaks, approximately one p.s.i. above atmospheric pressure worked well. Atmosphere which is non-reactive with the metals being used or melted is the main concern. For each embodiment, our work with the gas-atomizations used a free fall atomizing geometry with good results.

An especially useful embodiment of our invention provides finely divided metallic composition comprising an $AB_2$ alloy matrix within which is substantially uniformly dispersed discreet substantially spherical regions comprising $AB_5$ alloy and which have diameter within the range of about 0.05 micrometer through about one micrometer with the majority of inter-region distances being greater than about 1 micrometer, basic units of which composition have been treated to enhance exposure of $AB_5$ regions, surfaces, or their combinations. Reference to the previous embodiments will be useful for understanding various process ramifications and understanding the benefit of the host matrix within which is dispersed the minute discreet regions or domains or the precipitated phase making us this multi-phase alloy system. "Substantially uniformly dispersed" intends that the domains of this invention are separated from each other by, on average, generally similar distances, rather than being coalesced or aggregated. The fact of several thousand domains being half the distance apart as others nearby does not negate the substantial uniformity.

For production of electrochemical hydrogen storage materials, which are useful at least for production of electrodes for batteries and fuel cells or for other reaction surfaces, we have found it useful to make this type of multi-phase alloy system in which there is an alloy serving generally as a matrix and within which there is a generally even fine dispersion of a distinct second phase, having high hydriding/dehydriding kinetics and being present in discreet and minuscule regions or domains. With such a material of this unique matrix/dispersed phase in minute particles, advantage may be taken of the high hydrogen kinetics of the dispersed domains in combination with the high storage capacity of the matrix phase; thus forming a very capable material for electrochemical hydrogen storage.

To accomplish this, there must be preparation of multiple alloys; the preparation of the components of two alloys; preparation of one alloy, preferably the matrix-phase alloy with which is mixed the major components of the dispersed phase which are then allowed to scavenge metal from the matrix phase necessary to complete the dispersed phase; or their combinations. The phases of particular interest are those which are TiNi-type alloys to serve as the matrix, support, general storage medium and the $TiNi_5$-type alloys being the phase generally or substantially finely and evenly dispersed, in discreet domains, within the matrix. As noted earlier, these alloys may also be known in the art as $AB_2$-type alloys and $AB_5$-type alloys.

The previous process description is useful for determining processing or manufacturing methods. For the matrix alloy, the components will usefully include at least one transition metal other than nickel, preferably one or more of the elements of group 4 of the Periodic Table of Elements, combined with nickel or a suitable nickel-like analogue. Titanium is generally preferred as the element with which the nickel or nickel-analogue is combined, however it has been demonstrated that the zirconium and chromium combination is functional as the titanium analogue; other group 4 elements are expected, particularly with modifiers including those selected from group 6, to be functional as well.

It should also be understood that the products of interest, the minute particles comprising the matrix phase in which are the dispersed precipitate-like phase, may not necessarily comprise exactly stoichiometric alloys of the phases present. While alloys of interest may be known in the art as $AB_2$ alloys and $AB_5$ alloys, they are considered here by type or function; if they are not quite stoichiometric but behave as such nominal alloys would behave, they are considered within the sphere of our invention. The previously described ranges of components of the at least two alloys involved in these alloy systems describe the proper stoichiometry for each.

Ranges of ratios of phases are of interest. From the outset, it is to be considered that the alloy or alloys constituting the matrix material will be continuous while the inclusions or domains of the precipitated phase or phases will be discontinuous. Additionally it is preferred that domains of the precipitated material will be minute and substantially evenly dispersed throughout the matrix material.

To illuminate our invention and enhance its understanding, examples are provided below. They are provided only with intent to assist in understanding our work and are not to be considered in any limiting fashion. The only limitation of the scope of our invention appears in the claims which will follow the examples.

EXAMPLE

Designed multi-phase alloys were made with the intention of combining the high hydrogen kinetic properties of the $AB_5$ alloys with the high hydrogen storage capacity of the $AB_2$ alloys. Fluid atomization, particularly gas atomization, offers at least two benefits, having potential value for electrodes, of interest for energy conversion devices generally. First, atomization has the potential of providing very fine discreet particles. Second, atomization provides the potential to rapidly solidify, quench, or freeze, molten material in place very rapidly in light of the fine dispersion. When one of the phases of interest has a higher melting point than the other or others, that phase will of course solidify before the others. This is particularly the case with the TiNi$_5$-type alloys whose melting temperature is higher than that of the TiNi-type alloys.

Two levels of dispersion were considered to be of interest. Certainly, dispersion of molten material is of value to enhance available surface area of the material. Dispersion of a second phase of highly kinetic material within the first phase matrix of high storage capacity substance was thought to be a useful manner of coupling the benefits of high storage capacity with highly kinetic charge/discharge points. Securing the two levels of dispersion in a useful, effectively permanent, state seems important for gaining benefit of material disorder at the structural and translational levels. This is particularly the case for materials intended for use in electrodes for batteries or fuel cells.

Different multiphase alloys were prepared and tested. As a general matter these alloys were made as AB$_2$ matrices with intent to disperse an AB$_5$ phase, preferably uniformly and discontinuously, throughout each matrix. The general principles of atomization of the alloys, especially the metallic alloys developed here, particularly the multiphase materials, will be applicable in other systems as well.

Additions of mischmetal (Mm) were also included in the compositions. These metals are the rare-earth (RE) metals which are simply difficult, and therefore costly, to separate further. Generally they include high concentrations of lanthanum, cerium, or their combinations, and usually with notable amounts of neodymium, praseodymium, or their combinations, as well as minor amounts of other rare-earth metals. It was thought that these materials would form useful distinct AB$_5$ phase materials within the AB$_2$ matrix phase. Calcium with mischmetal and lanthanum substitutions were of interest to encourage formation of CaMmNi$_5$, LaNi$_5$, or any other AB$_5$ phase which could, with appropriate view or understanding of the phases involved, be expected to have notably high kinetics for hydrogen storage. It was expected that inclusion of such a phase would provide distinct regions of the AB$_5$ discontinuously within the AB$_2$ matrix. Such distinct regions of AB$_5$ phase behave like precipitates and will be designated as such in this description as they are, indeed, precipitated from the surrounding solid solution.

Sample Preparation

A general scheme of sample preparation was followed for each of the exemplified multi-phase alloys. Unless otherwise noted, each example was prepared in the same manner.

Each batch, identified as a "heat" or melt, was melted in a single cast, monolithic crucible of >90% alumina composition. Crucible preparation prior to a heat included a washcoat of pure alumina. The alumina wash resulted in slightly higher oxygen content in the melts, but the total oxygen plus nitrogen content remained the same. After working with the selected alloys to learn how they are best handled, melt sizes were steadily increased from twenty to forty pounds with good results. The chemical analyses were in general quite close to the aim values, once some experience was gained to establish recovery factors for the more reactive elements such as Zr and Ti.

Known or pre-made AB$_2$ alloys, which included zirconium, of interest were used and melted in the described crucibles under an argon atmosphere by Crucible Research in Pittsburgh, Pa. USA. The alloys were superheated, in these cases to about 200° C. over the melting temperature of about 1,500° C. If a previously made ingot, of desirable alloy, was not available then the components to make the desired alloy were combined and melted as a separate heat. Dross, when present in notable quantities, was removed by skimming prior to atomization to prevent or minimize nozzle clogging. To form the AB$_5$ phase, small amounts of either the desired AB$_5$ alloy or the components to make the AB$_5$ alloy were added to the heat. Often, components needed for that alloy were added without the accompanying addition of more nickel, thus allowing the other components to scavenge nickel from the formers of the AB$_2$ phase to form the AB$_5$ phase.

After melting fully and removing dross if present, the crucible was tilted above a heated tundish to initiate pouring of the melt and start the atomization process. The melt flows into the tundish and out from an opening at the bottom of the tundish. A ceramic nozzle helps guide the melt downward to the atomizing gas (argon). The melt is disrupted by the impact of the high pressure atomizing gas that results in forming millimeter and sub-millimeter size melt droplets. The high pressure fluid (atomizing gas) rapidly expands out from the atomizer nozzle as it accelerates to supersonic speed, thereby cooling the gas to below freezing temperature. In this manner, the atomizing fluid not only atomized the molten metal into millions of minute droplets, it also rapidly quenches, or solidifies, the metal droplets. In light of the large surface to volume ratio in the droplets, the melt can experience temperature drops in the range of greater than about $10^{3°}$ C./sec. This may be compared with commercial ingot casting which will achieve cooling rates of about 10° C./sec at best. This rapid solidification process helps refine and solidify the TiNi$_5$-type phase as fine domains, or "dispersoids" (dispersed material within the dispersed particles) within the TiNi-type matrix. We have obtained sub-$\mu$m dispersoids with less than about 5 $\mu$m spacing between them using this technique. The size and spacing of the discreet domains may be altered and controlled by the solidification rate during atomization. The atomization nozzle is known in the art and is a metallic nozzle with an annular ring as a jet orifice through which the atomizing fluid is forced under high pressure, generally of greater than ten bars, after which it contacts the molten metal which flows down a ceramic tube. The high velocity gas or other fluid then impinges upon the melt which is atomized into fine droplets cooling into fine powder.

Factors of interest for atomized AB$_2$-type alloy powders which include notable amounts of group 4 metals other than titanium, as particularly noted with zirconium, include stoichiometry, nickel content, ionic radius of the B-sites and alloy powder particle size. Stoichiometric or somewhat over stoichiometric alloys (AB$_{2+}$ materials) generally seem to yield electrodes displaying better discharge capacities than do those alloys which are understoichiometric (AB$_{2-}$ materials). Increasing the specific nickel content in the alloy and increasing the size of B-site ions also appear to yield enhanced discharge capacity. Capacity also generally tends to increase with diminishing powder size in which there is increased surface-to-volume ratio, thereby apparently improving charge/discharge kinetics and overall useful capacity. In tandem with particle size consideration, it is useful to also consider that slower cooling rates in larger-sized powdered alloy materials favor formation of a C15-phase which may tend to enhance wet cell capacity.

Overall, atomization, particularly gas-atomization of mixed phase alloys, notably those of TiNi-type and TiNi$_5$-type with either the majority component provides a useful means of engineering materials at the translational level of organization. Opportunities arise with gas-atomization to grow infinitesimal domains which are distributed within a matrix and freeze them in place at the desired sizes, inter-domain distances, and distributions within the matrix phase as well as provide control of overall alloy-system particle size.

Substitutions of the $AB_5$ alloy were made in the $AB_2$ alloy. Table 1, below, displays the composition of the metal alloy preparations.

TABLE 1

Compositions of designed multi-phase alloys

| Alloys Ex. | At % | Zr | Ti | V | Cr | Mn | Ni | Ca | Mm/La |
|---|---|---|---|---|---|---|---|---|---|
| #1 | Aim | 19.00 | 14.49 | 12.00 | 10.00 | 10.00 | 34.50 | | |
| #2 | Aim | 18.05 | 13.77 | 10.51 | 8.76 | 8.76 | 38.59 | 1.17 | 0.50 |
|  | DCP | 18.11 | 13.75 | 10.51 | 9.04 | 8.85 | 39.36 | 0.11 | 0.28 |
| #3 | Aim | 17.90 | 13.66 | 11.31 | 9.42 | 9.42 | 36.63 | | 1.65 |
|  | DCP | 18.20 | 13.73 | 11.26 | 9.44 | 9.51 | 36.45 | | 1.42 |
| #4 | Aim | 18.81 | 14.36 | 11.88 | 9.90 | 9.90 | 34.99 | | 0.167* |
|  | DCP | 18.81 | 14.36 | 18.81 | 9.96 | 9.92 | 35.01 | | 0.066* |
| #5 | Aim | 24.75 | 7.92 | 4.95 | 4.95 | 15.84 | 41.42 | | 0.167* |
|  | DCP | 24.61 | 7.88 | 5.04 | 5.13 | 15.99 | 41.36 | | 0.089* |
| #6 | Aim | 15.84 | 17.33 | 11.88 | 7.92 | 15.84 | 31.03 | | 0.167* |
|  | DCP | 15.88 | 17.29 | 11.81 | 7.95 | 16.03 | 31.03 | | 0.043* |
| #7 | Aim | 18.81 | 14.36 | 11.88 | 9.90 | 9.90 | 34.99 | 0.167 | |
|  | DCP | 19.08 | 14.25 | 11.67 | 9.9 | 9.99 | 35.10 | 0.002 | |
| #8 | Aim | 15.84 | 17.33 | 11.88 | 7.92 | 15.84 | 31.03 | 0.167 | |
|  | DCP | 16.02 | 17.25 | 11.80 | 7.81 | 16.08 | 31.03 | 0.004 | |

Aim = Intended composition
DCP = Analysis by direct charge coupling
*Indicates La (only) content; others in this column are misch metal (Mm) additions As noted near the bottom of the chart, "Aim" provides the intended or "aimed-for" composition of the designed alloy while "DCP" provides the final composition according to chemical analysis by direct charge coupling measurement. Three examples used lanthanum addition rather than misch metal; these are designated with an asterisk (*). It may be noted from the compositions presented that the presence of metallic calcium in the alloy presents special handling needs, apparently due to its low melting temperature and its volatility at the melting, pouring, or tap temperature of the other alloy components or that of their combination. One solution to this need for special handling would be to conduct melting under pressure greater than the partial pressure of molten calcium. Another of the solutions available involves designing alloys with sufficiently large amounts of starting materials such that boil-off of high vapor pressure components will actually accomplish the final desired composition. Advantageously this process could be accomplished under an atmosphere, argon or xenon being among sensible candidates, which excludes ambient atmosphere constituents likely to react with calcium or other reactive alloy components.

Figure 2:
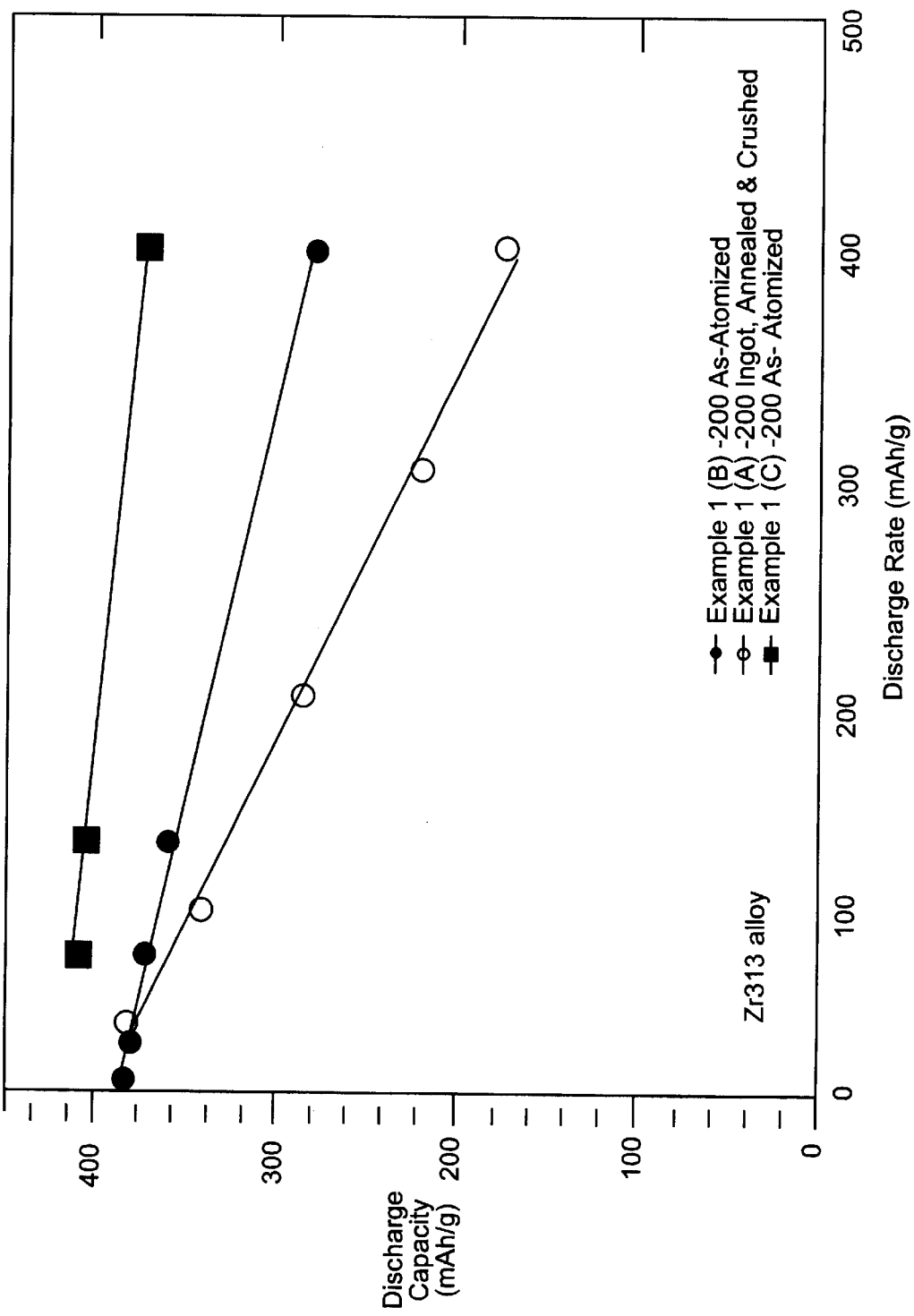
FIG. 2 provides. a graphic presentation of discharge capacity plotted against discharge rate for battery electrodes made from the various metal powders of Example 1.
Figure 3:
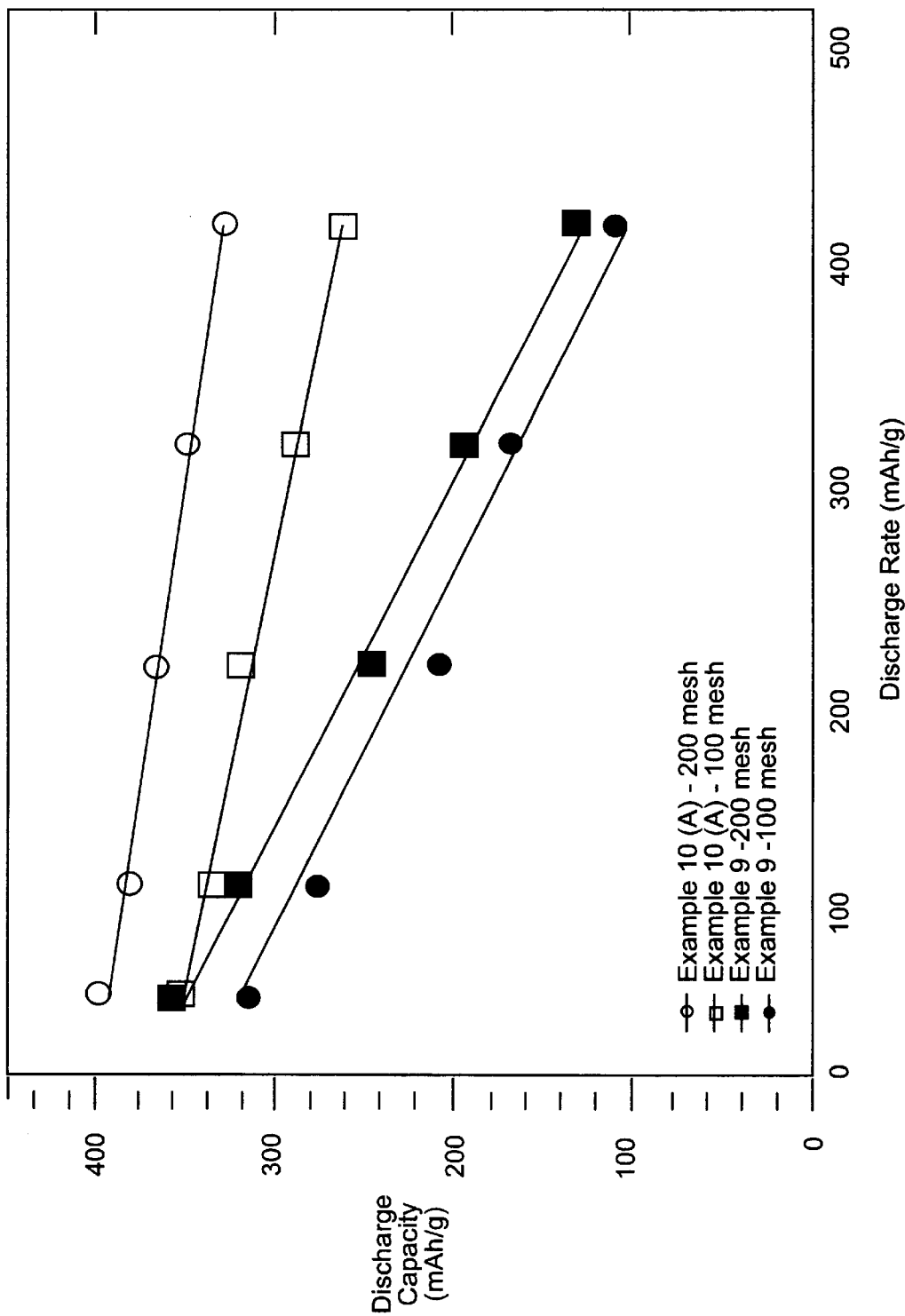
FIG. 3 provides a graphic presentation of discharge capacity plotted against discharge rate for battery electrodes made from the various metal powders of Examples 9 and 10.
Figure 4:
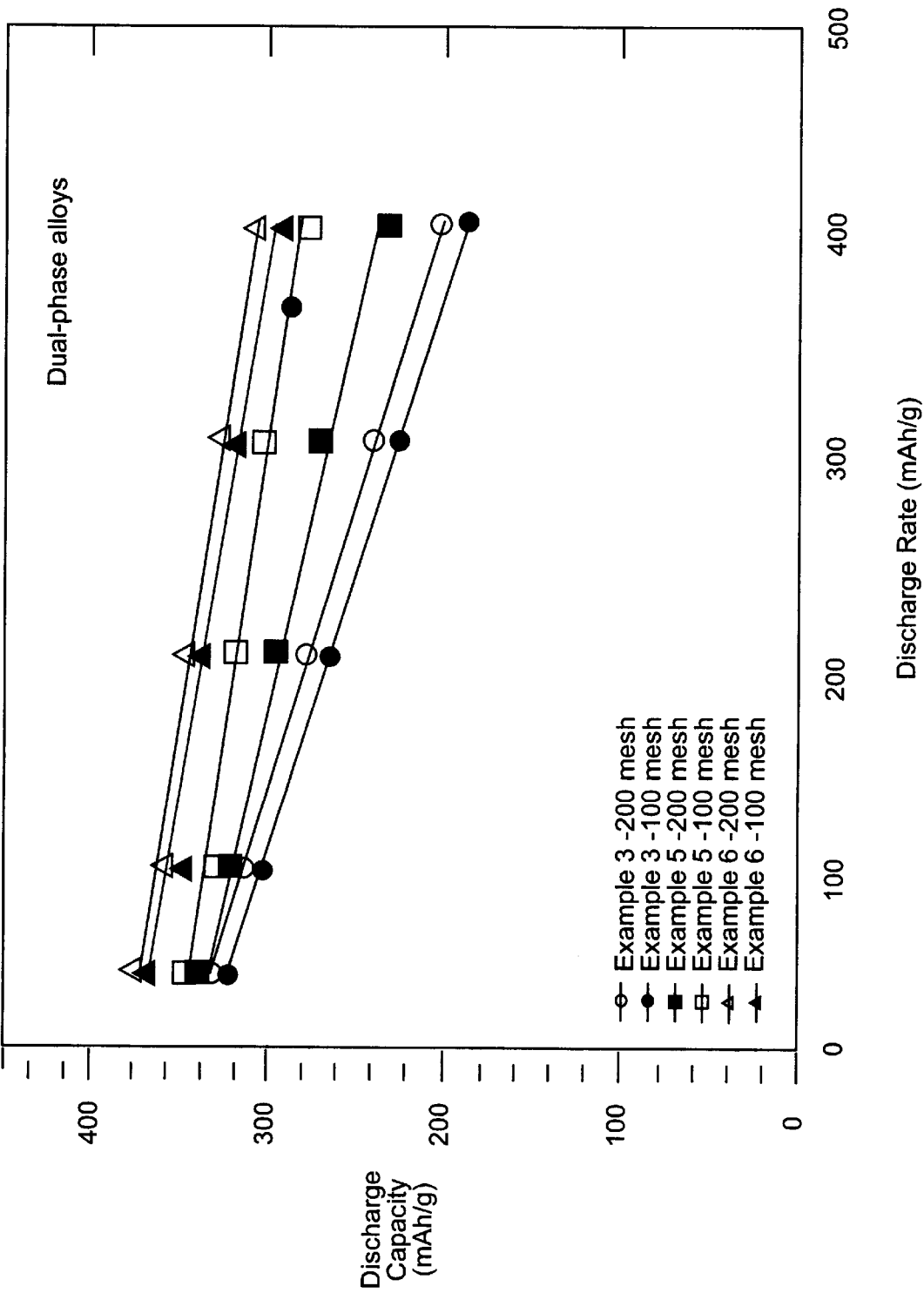
FIG. 4 provides a graphic presentation of discharge capacity plotted against discharge rate for battery electrodes made from the various metal powders of Examples 3, 5, and 6.
Figure 5:
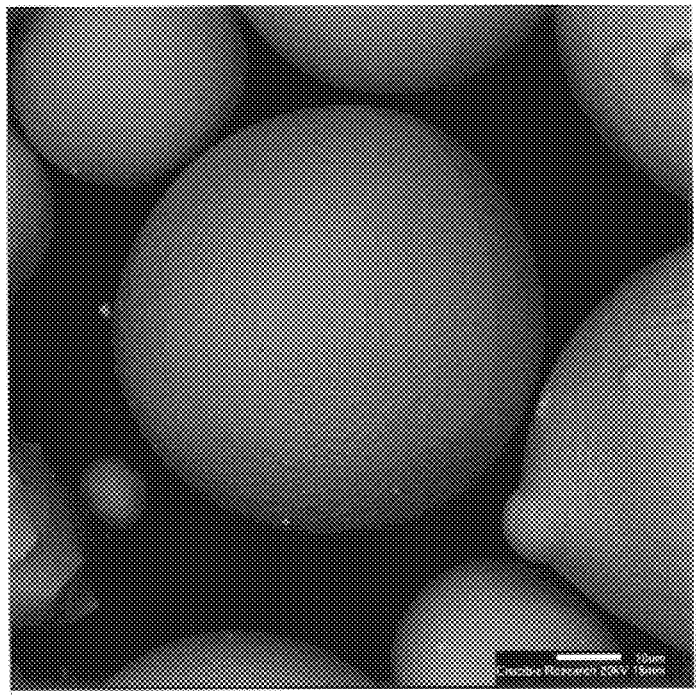
FIG. 5 provides an SEM micrograph of the powder surface of material produced in Example 6.
Figure 6:
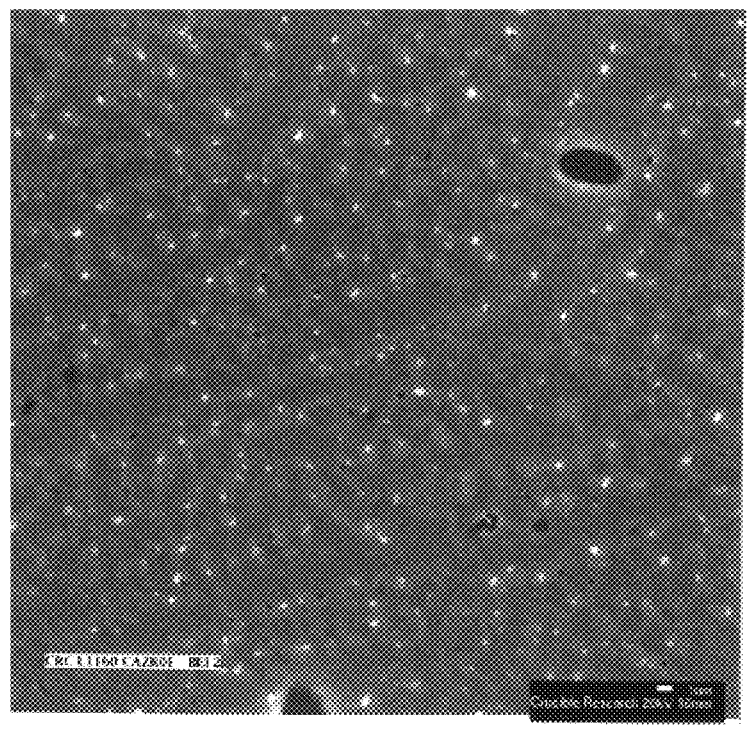
FIG. 6 provides a backscatter scanning electron micrograph of a polished section of a 75 $\mu$m particle, produced through the rapid-quenching or solidification technique of gas-atomization, of TiNi-type material matrix with highlighted TiNi$_5$-type material dispersed throughout.
Figure 7:
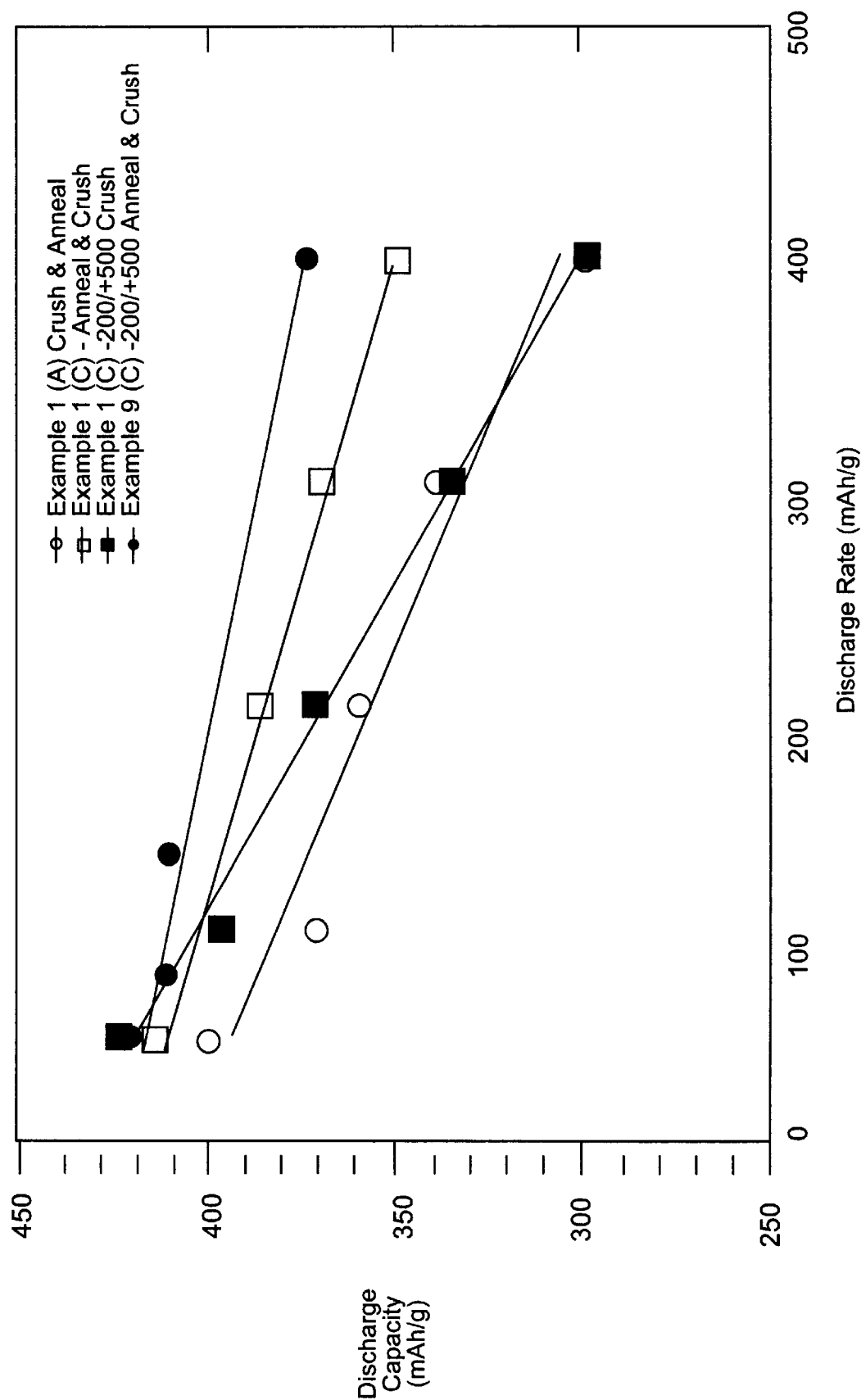
FIG. 7 provides a graphic presentation of discharge capacity plotted against discharge rate for battery electrodes made from the various metal powders of Example 1.
Figure 8:
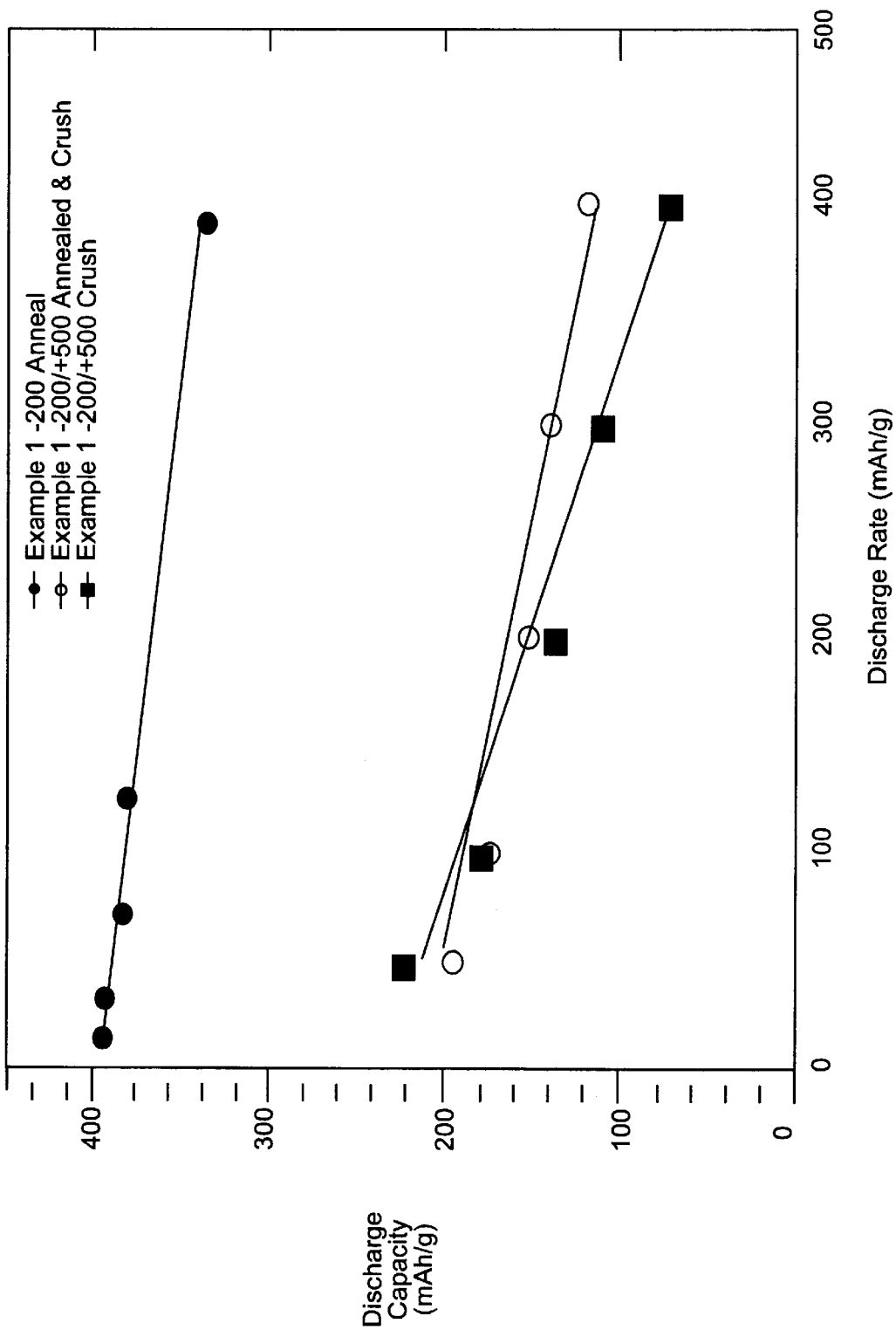
FIG. 8 provides a graphic presentation of discharge capacity plotted against discharge rate for battery electrodes made from the various post-formnation treated metal powders of Example 10.
Figure 9:
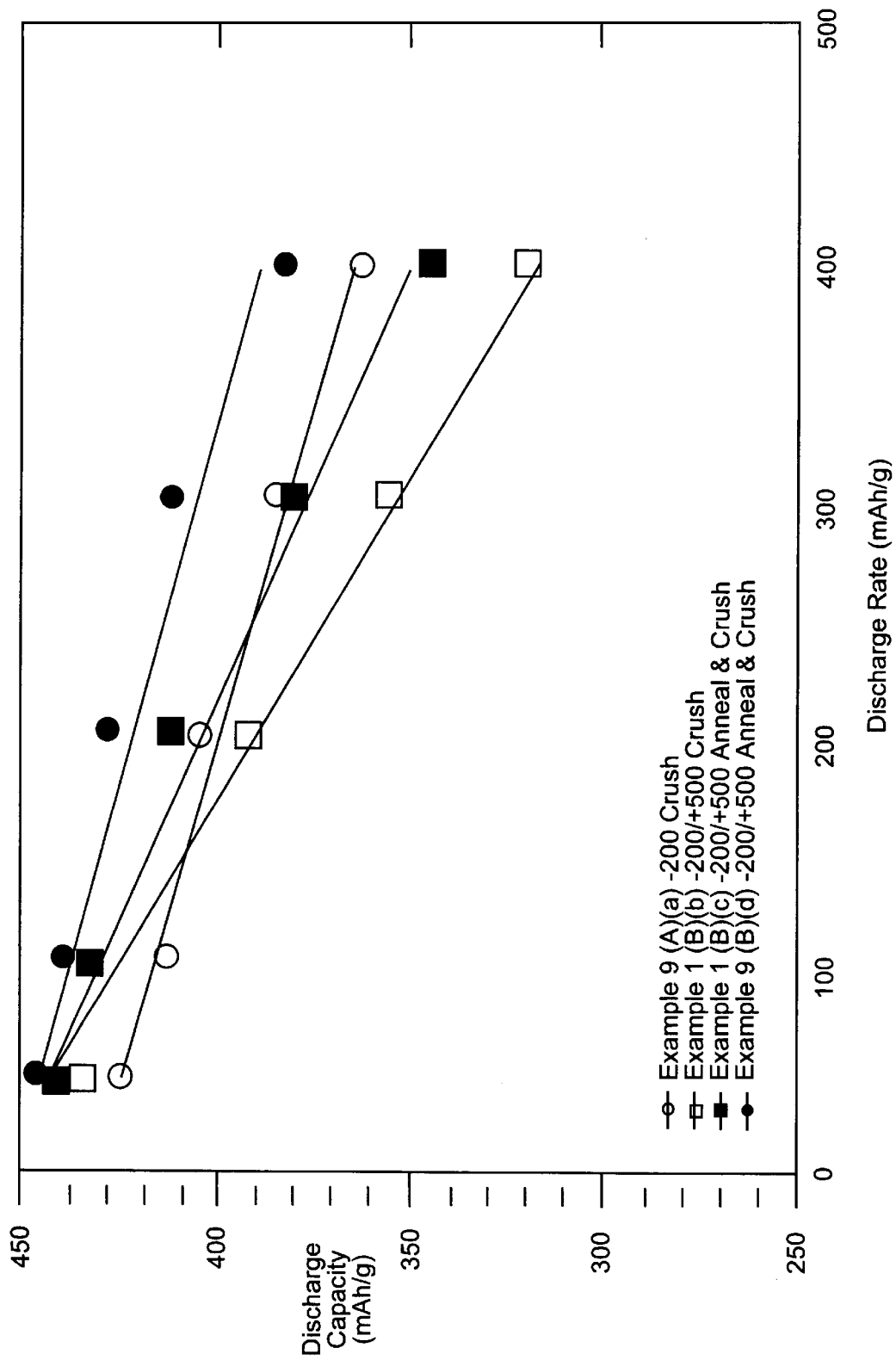
FIG. 9 provides a graphic presentation of discharge capacity plotted against discharge rate for battery electrodes made from the various post-formation treated metal powders of Example 9.
Figure 10:
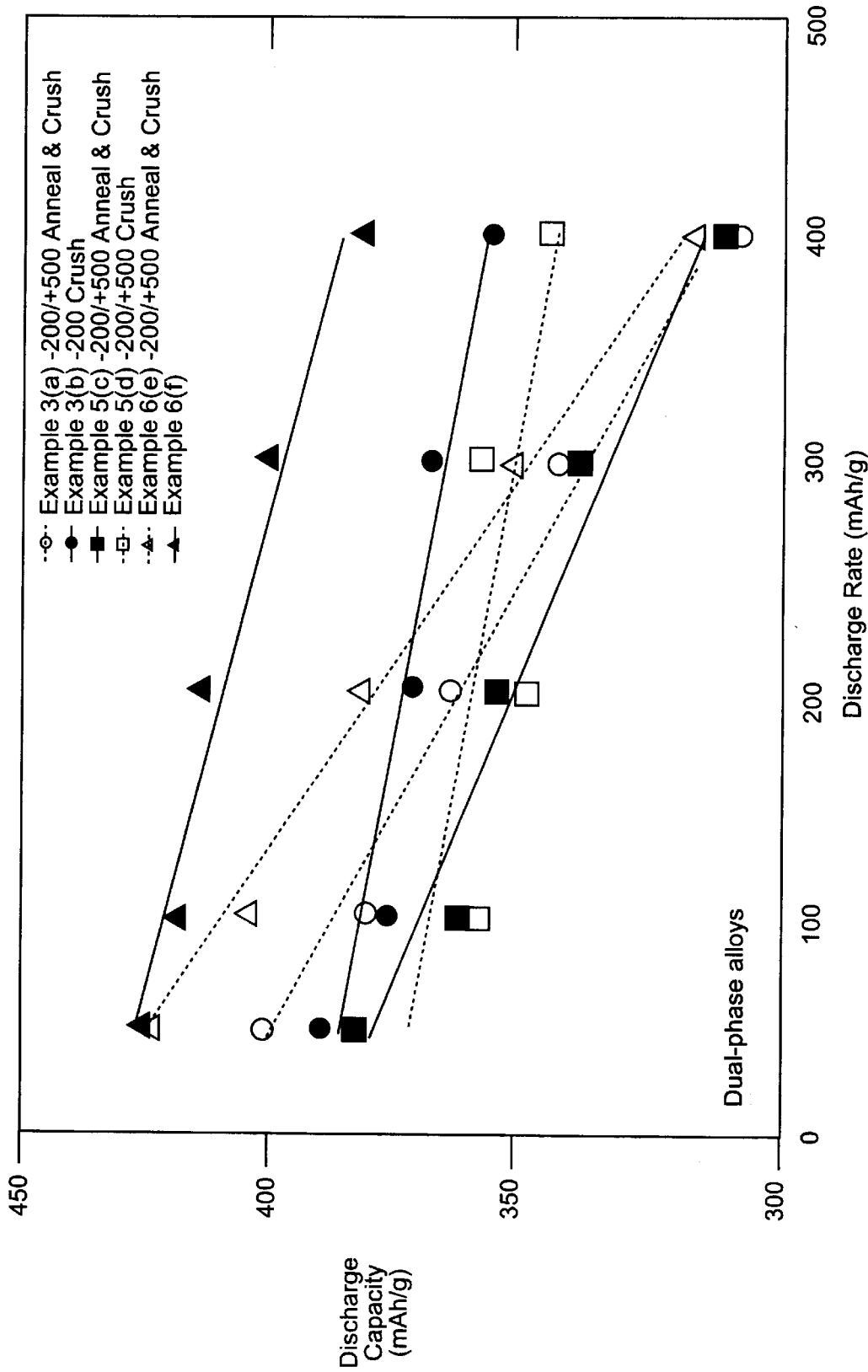
FIG. 10 provides a graphic presentation of discharge capacity plotted against discharge rate for battery electrodes made from the various post-formation treated metal powders of Examples 3, 5, and 6.

The atomized powders were sieved to classify and select those fractions of less than 100 mesh (−100), or less than about 150 um; and less than 200 mesh (−200), or less than about 75 um. These were then formed into electrodes and wet cell tested for discharge capacities using an Arbin BT-2000 multichannel battery tester. The results of this initial test are provided in Table 2 below. Analysis of the powders was conducted and it was noted that there were distinct regions of $AB_5$ precipitates fairly well and evenly dispersed throughout the $AB_2$ matrix, this may be viewed in the SEM backscatter micrograph presented as FIG. 2. Further analysis of the substantially sub-micrometer precipitates, when they appeared on the outside of the alloy-system atomized and rapidly quenched particles, demonstrated that the $AB_5$ precipitates were highly oxidized on their surfaces. It is believed that formation of such insulating oxides interferes with or diminishes the hydrogen affinity of the materials thereby lowering the discharge rates.

To optimize the exposure of non-oxidized, and therefore enhance the hydrogen kinetics of, precipitate surfaces, samples were subjected to crushing, annealing, and their combinations. This was expected to expose the non-oxidized surfaces of the $AB_5$ precipitates which were believed to be available within the as-atomized composition powder particles. Annealing, when done, was accomplished by heating samples at 800° C. for five minutes.

Crushing, when used, was accomplished by fracturing the particles to expose internal, non-oxidized $AB_5$ particles and the $AB_5/AB_2$ interfaces. A laboratory-sized Gilson ball-mill with an about five cm (two inch) steel ball was used in an argon-purged glove box. Comparisons among various treatment options are presented in Table 2 below.

TABLE 2

Maximum and High-rate Discharge Capacities of Test Alloys

| Alloy | Designation | Process | Size fraction | High-rate | Maximum |
|---|---|---|---|---|---|
| Ex. #1 | (A) | Crushed/Annealed Ingot | −200 | 373 | 410 |
| (#1) | (B) | As-atomized | −200 | 280 | 380 |
| (#1) | (C) | As-atomized | −200 | 174 | 384 |
|  | (C) | Atomize/Anneal & Crush | −200/+500 | 349 | 414 |
|  | (C) | Atomize/Anneal & Crush | −200 | 298 | 399 |
|  | (C) | Crushed | −200/+500 | 297 | 423 |
| (#3) | (A) | Atomize/Anneal & Crush | −200/+500 | 358 | 390 |
| (#5) | (A) | Atomize/Anneal & Crush | −200/+500 | 311 | 384 |
| (#5) | (A) | Atomize & Crush | −200/+500 | 345 | 384 |
| (#6) | (A) | Atomize/Anneal & Crush | −200/+500 | 383 | 427 |
| (#6) | (A) | Atomize & Crush | −200/+500 | 316 | 425 |

It may be noted that the capacity of 425 mAh/g was comparable to that of annealed and crushed powder, but the high-rate discharge capacity was lower for crushed-only powder, showing 316 mAh/g.

Example 9, a TiNi-type material, was made, by atomic %, nominally with 16% Zr, 17.5% Ti, 8% Cr. 12% V, 30.5% Ni, and 16% Mn. Post heat analysis indicated 0.05% Fe, 0.06% Si, 0.42% Si, and, in weight parts per million, 65 wppm C, 970 wppm O, and 85 wppm N. This was used as post-atomization study in which combinations of crushing and annealing were tested; results are presented in Table 3 below. The maximum and high-rate discharge capacities for annealed and crushed material from Example #9 was 438 mAh/g and 341 mAh/g, respectively; this was an improvement over crushed-only powder that had maximum and high-rate discharge capacities of 435 mAh/g and 311 mAh/g, respectively. With processing by annealing the powder before mechanical crushing, it was noted that the X-ray Diffraction (XRD) patterns of the crushed powder showed significant lattice distortion demonstrated by the lattice peak broadening. It was found that such capacities may be improved by reversing the annealing and crushing process so that the powder is annealed after having been crushed. The maximum and high-rate capacities improved to 443 mAh/g and 382 mAh/g.

TABLE 3

Maximum and high-rate discharge capacities of alloy of Example 9

| Alloy (#9) | Designation | Process | Size fraction | High-rate | Maximum |
|---|---|---|---|---|---|
| (#9) | (A) | Crushed Annealed Ingot | −200 | 362 | 424 |
| (#9) | (B) | As-atomized | −200 | 129 | 355 |
| | (C) | As-atomized | −100 | 108 | 344 |
| | (D) | Atomize/Anneal & Crush | −200/+500 | 341 | 438 |
| | (E) | Atomize & Crush | −200/+500 | 311 | 435 |
| | (F) | Atomize/Crush & Anneal | −200/+500 | 382 | 443 |

It was determined that annealing of the −35 to +60 mesh fraction of as-atomized powders at 800° C. for five minutes followed by mechanical crushing to −200 to +500 mesh (−75 to 25 um) appeared to significantly improve the discharge capacity of the multi-phase alloy powders made by gas atomization. While not wishing to be bound by theory, this is believed to be so since the fractured surfaces were devoid of oxide surfaces, thereby enabling rapid hydrogen transport without interference at the oxidized surface. Scanning electron microscope (SEM) micrographs of mechanically fractured surfaces of annealed and crushed Example #1 alloy particles with a 5 wt % addition the alloy of Example #2 of showed fine distribution of lanthanum-enriched regions, which appear to behave as precipitates and so will be designated as such, dispersed throughout the host matrix.

These $AB_5$ precipitates are generally less than about one micrometer in effective diameter and on average appear to be less than about five micrometers apart. Such refined distribution of the $AB_5$ phase, the key to rapid hydrogen transport, appears to be delivered by the product of rapid solidification or freezing which is made available through atomization of the molten multi-phase alloy composition. Such atomization allows creation of notably high greater total surface area for the precipitates by rapidly solidifying finely dispersed multi-phase alloy system which in this case contains the sub-micrometer $AB_5$ precipitates, thereby apparently enhancing transport of electrochemically activated hydrogen which is immensely useful for storage and generation of energy in batteries and fuel cells. "Effective diameter" generally intends the diameter which would be occupied were the object a perfect sphere; normally this will be the longest dimension through the greatest bulk of the object or, in this instance the discreet domain. For an odd-shaped domain, if its odd shape has little effect on its neighboring environment then a smaller dimension may define the effective diameter.

All alloyed powder samples, including powder crushed from ingot, were pressed into a copper grid under 10 tons of pressure to make the electrochemical samples. The samples weighed between 45 and 55 milligrams. A polymer based separator divided the electrochemical sample in the center from the Ni(OH)2 counter electrode compressed on either side. Six normal KOH solution served as the electrolyte for the wet cell. The NiM/H samples were tested on a BT2000 Multi-Station Battery Testing System, from Arbin Instrument. The electrochemical discharge capacities were measured at discharge rates of 50, 100, 200, 300, and 400 mA/g (corresponding to C/8, C/4, C2, 3C/4 and C discharge rates, respectively) after the samples have been charged and discharged a total of nine time, ensuring complete activation of the samples. The electrochemical samples are charged for 12 hours at 50 mA/g before each high-rate discharge measurements. All electrochemical discharge capacities are measured from the fully charged state discharged to 0.9 volts. For each alloy condition, the highest and the lowest values of the six electrochemical measurements were omitted and the remaining four values were averaged to give the results presented here.

Electrochemical capacities for as-atomized TiNi-type alloys are given in Table 4 below. Examples #1 and #9 have been previously described; Example #10 is simply the TiNi-type host or mother alloy described in Examples #4 and #7 without the inclusion of, respectively, lanthanum or calcium as the scavenger to form the second finely dispersed phase. The maximum discharge capacity is measured at a discharge rate of C/8 and high-rate discharge capacity is measured at a discharge rate of C. In general, the C/8-rate discharge capacities exceeded 340 mAh/g, with ZrO3 (L1179) having the highest capacity at 394 mAh/g. The C-rate discharge capacities were below the maximum capacities, with ZrO3 having the highest C-rate capacity at 325 mAh/g. It appears that capacities measured from finer powders (<200 mesh) performed better than capacities measured from coarser powder (<100 mesh). This may attributed to the larger surface area in finer powders than in coarser powders for an equal sample weights.

The electrochemical capacities of as-atomized dual-phase alloys, are presented in Table 2 above. For as-atomized dual-phase powder screened to <200 and <100 mesh powder fraction, there did not appear be any improved discharge capacities compared to unmodified Zr-bearing alloy powders. The C/8-rate discharge capacities for the dual-phase alloys were in general below 376 mAh/g, with MmZrO5 having the highest capacity at 376 mAh/g. In the as-atomized dual-phase alloys, the discharge capacities for coarser powders appeared to be higher than that for finer powders. This was observed for both the C-rate discharge and C/8-rate discharge capacities. The is contrary to what was observed in unmodified zirconium-based alloys. This difference can be explained by the fact that the performance of as-atomized dual-phase alloys are a function of solidification rate of the powder, while unmodified Zr-based alloys' performance is a function of powder surface area.

In inert gas atomization of alloyed melt, it is well documented that coarse powder particles solidify more slowly than finer particles. By this fact, the second phase that precipitates inter-dendritically, in the large particle, would have a longer solidification time, leading to the potential of having the second phase expelled from the bulk to solidify on the powder particle surface. Finer powders, on the other hand, owing to the higher rapid solidification rate, would tend to trap the second-phase within the powder particle. In light of this phenomenon, less second phase would be present on the finer powder surfaces than in larger particles, thereby less catalytic second-phases are available to for rapid hydrogen desorption during C-rate discharge in finer particles.

The expectation of a significant quantity of $AB_5$ precipitates finely dispersed on the surface of the as atomized powders, like those found inside the powder particle (FIG. 2), was not realized with only 1% $AB_5$ substitution. SEM micrograph images of Example 3 as-atomized, with 5% substitution, showed some, but fewer than expected, rare-earth enriched second phase particles on the powder surface. Therefore the as-atomized powders were mechanically crushed to expose the fine precipitated second-phase among the un-oxidized internal particle surfaces. Greater amounts of the finely dispersed phase, supplied by inclusion of greater amounts of that phase, would be expected to enhance the numbers of the dispersed phase domains.

The C/8-rate and C-rate discharge capacities for annealed and crushed powders from Example 9 were 438 mAh/g and 341 mAh/g, respectively. These results showed improvements in high-rate discharge capacity over crushed-only powder that had maximum and high-rate discharge capacities of 435 mAh/g and 311 mAh/g, respectively. It was found that the discharge capacities can be improved by reversing the annealing and crushing process, so that the powder is crushed before annealing. The C/8-rate and C-rate capacities improved to 443 mAh/g and 382 mAh/g, respectively, when the powder is annealed after it was crushed to −200 to +500 mesh fraction. It appears that the high-rate discharge capacities could be substantially improved by reversing the processing, so as to anneal the powder after it has been crushed. Results are presented in Table 4 below.

TABLE 4

Maximum and high-rate discharge capacities of as-atomized $AB_2$ alloys with large amounts of zirconium

| Alloy | Designation | Process | Size fraction | C-rate discharge capacity | C/8-rate discharge capacity |
|---|---|---|---|---|---|
| #1 | (B) | As-atomized | <200 | 280 | 380 |
|  | (B) | As-atomized | <100 | 269 | 389 |
|  | (C) | As-atomized | <200 | 174 | 384 |
|  | (C) | As-atomized | <120 | 148 | 387 |
| #10 | (A) | As-atomized | <200 | 325 | 396 |
|  | (A) | As-atomized | <100 | 257 | 350 |
| #9 | (A) | As-atomized | <200 | 129 | 355 |
|  | (A) | As-atomized | <100 | 108 | 344 |

Electrochemical capacities of processed dual-phase alloys appeared to have excellent C/8-rate discharge capacities that are above 380 mAh/g, with annealed and crushed multiphase alloy system of Example #6 demonstrated the highest capacity at 425 mAh/g; results are presented in Table 5 below. This same alloy system also had the highest C-rate discharge capacity of all alloys, measuring at 383 mAh/g. Annealed and crushed powders of alloy-systems of Examples #3 and #6 showed significant improvement in high-rate discharge capacities over those powders that are crushed only. Discharge capacities of processed multi-phase alloy-systems showed remarkable improvement over as-atomized powders. For fractions less than 200 mesh, the maximum and high-rate discharge capacities for the alloy-system of Example #6 increased to 427 mAh/g and 383 mAh/g, respectively, from as-atomized capacities of 371 mAh/g and 290 mAh/g, respectively. Example #6 powder that was crushed only (no annealing) had C/8-rate capacity of 425 mAh/g that was comparable to that of annealed and crushed powder, but the C-rate discharge capacity was lower for crushed-only powder, showing 316 mAh/g.

TABLE 5

C/8-rate and C-rate discharge capacities of processed zirconium-based AB2 alloy

| Alloy | Designation | Process | Size fraction | C-rate discharge capacity | C/8-rate discharge capacity |
|---|---|---|---|---|---|
| #1 | (A) (ingot) | Crushed & Annealed | <200 | 373 | 410 |
|  | (B) | Annealed & Crushed | <200 | 298 | 399 |
|  | (B) | Crushed | 200 to 500 | 297 | 423 |
|  | (B) | Annealed & Crushed | 200 to 500 | 349 | 414 |

TABLE 5-continued

C/8-rate and C-rate discharge capacities of processed zirconium-based AB2 alloy

| Alloy | Designation | Process | Size fraction | C-rate discharge capacity | C/8-rate discharge capacity |
|---|---|---|---|---|---|
| #10 | (A) | Annealed | <200 | 272 | 343 |
|  | (A) | Annealed & Crushed | 200 to 500 | 109 | 217 |
|  | (A) | Crushed | 200 to 500 | 75 | 238 |
| #9 | (A) ingot | Crushed & Annealed | <200 | 362 | 424 |
|  | (B) | Crushed | 200 to 500 | 311 | 435 |
|  | (B) | Annealed & Crushed | 200 to 500 | 341 | 438 |
|  | (B) | Crushed & Annealed | 200 to 500 | 382 | 443 |

Although the gas-atomized powder of the alloy-system of Example#3 (−200 mesh) powder showed C/8-rate and C-rate discharge capacities of 322 mAh/g and 174 mAh/g, respectively; which compared poorly with annealed ingot-cast materials of Example #1. When the Example #3 −35 to +60 mesh powder was annealed at 800° C. for 5 minutes followed by mechanical grinding and sieving to −200 to +500 mesh (−75 to +25 microns), significant improved the total and high-rate capacities to 390 mAh/g and 358 mAh/g, respectively, were observed. The maximum and high-rate discharge capacities of Example #3 are still less than the capacities of annealed and crushed ingots powder of the Example #1 TiNi-type alloy, however, the slope of discharge capacity versus discharge rate was less for the processed dual-phase alloy of Example #3 than for the annealed and crushed ingot powder of The Example 1 alloy. This result further confirming that the discharge rate of AB2 Zr-bearing alloys may be improved by small additions of AB5 phases.

TABLE 6

Maximum and high-rate discharge capacities of processed multi-phase alloys

| Alloy | Designation | Process | Size fraction | C-rate discharge capacity | C/8-rate discharge capacity |
|---|---|---|---|---|---|
| Ex. #3 | (A) | Annealed & Crushed | 200 to 500 | 358 | 390 |
|  | (A) | Crushed | <200 | 309 | 402 |
| #5 | (A) | Annealed & Crushed | 200 to 500 | 311 | 384 |
|  | (A) | Crushed | 200 to 500 | 345 | 384 |
| #6 | (A) | Annealed & Crushed | 200 to 500 | 383 | 427 |
|  | (A) | Crushed | 200 to 500 | 316 | 425 |

Improvements in discharge capacities were also observed for the −35 to +60 mesh of gas atomized alloy of Example 1 (heat C.), produced from the 800 pound atomizer, after it was annealed at 800° C. for 5 minutes, crushed, and sieved to −200 to +500 mesh. A high rate capacity of 349 mAh/g at discharge rate of 400 mA/g was achieved with the annealed and crushed Example #1 powder material compared to the 373 mAh/g of the annealed and crushed ingot powder. Annealed Example #1 powder crushed to −200 to +500 Mesh appeared to give the best high rate capacity compared to annealed and crushed powders screened to −200 mesh. This is probably because most of the powder material below −500 Mesh fraction is made up of surface oxide fragments of the powder, resulting from the mechanical crushing process. Therefore, one would not expect the −500 Mesh powder fraction to contribute to the total hydrogen storage, rather the ultra-fine powders would retard hydrogen sorption because of its oxide fragments. Similarly, crushing the Example #1 powder to −200 to +500 mesh fraction without annealing was found to provide little benefit to the high rate capacity of the alloy. Apparently, both the annealing and crushing process step of the powder is required to improve the wet cell capacities of the gas-atomized alloys to levels comparable to that of annealed and crushed-ingot alloys.

It is clear that multi-phase alloys, particularly when the dispersed or precipitated phase is finely dispersed in discreet domains will function to enhance the combination of electrochemical hydrogen storage and kinetics in a useful manner. These alloy systems of a host matrix and dispersed phase will be useful in battery and fuel cell electrodes.

As noted earlier, the examples are intended to assist in understanding of our invention; they are not to be considered in any limiting fashion.

We claim:

1. A method of making a hydrogen storage material comprising the steps of:
   (a) forming a molten mixture comprising nickel and at least one other transition metal element, the combination of which will form a TiNi based alloy and including in said molten mixture from about 0.1 at. % to about 10 at. % of one or more elements capable of alloying with nickel; and
   (b) cooling said molten mixture to form a plurality of distinct immiscible precipitates containing said one or more elements and nickel which are substantially evenly distributed throughout said hydrogen storage material.

2. The method of claim 1 wherein said one or more elements are present in an amount between about 1 atomic % and about 7 atomic %.

3. The method of claim 2 wherein said at least one other transition metal, of step (a) includes at least one metal selected from group 4 of the Periodic Table of the Elements.

4. The method of claim 3 wherein said one or more elements are selected from the group consisting of rare earth elements, lanthanum, Sc, Y, Ca, Sr, Ba, mischmetal and their combinations.

5. The method of claim 4 wherein said one or more elements are selected from the group consisting of rare earth elements, lanthanum, Y, Ca, mischmetal, and their combinations.

6. The method of claim 2 wherein said molten mixture is cooled at a rate between about $10^{3\circ}$ C. per second and about $10^{5\circ}$ C. per second.

7. The method of claim 6 wherein said one or more elements are selected from the group consisting of rare earth elements, lanthanum, Sc, Y, Ca, Sr, Ba, mischmetal and their combinations.

8. The method of claim 7 wherein said one or more elements which are selected from the group consisting of rare earth elements, lanthanum, Y, Ca, mischmetal, and their combinations.

9. The method of claim 8 wherein said molten mixture is cooled at a rate between about $10^{3\circ}$ C. per second and about $10^{4\circ}$ C. per second.

10. The method of claim 1 wherein said molten mixture includes one or more additional elements selected fromt he group consisting of V, Zr, Al, Co, Cr and Mn.

11. The method of claim 1 including the further step of crushing and/or annealing said hydrogen storage material to form a particulate exposing a greater surface area.

12. The method of claim 1, wherein said molten mixture is cooled using gas atomization.

* * * * *